(12) United States Patent
Kawahara et al.

(10) Patent No.: US 8,995,108 B2
(45) Date of Patent: Mar. 31, 2015

(54) COUPLING STRUCTURE FOR AIRFRAME COMPONENTS

(71) Applicant: Mitsubishi Aircraft Corporation, Aichi (JP)

(72) Inventors: Koji Kawahara, Tokyo (JP); Hideo Yamakoshi, Tokyo (JP); Yuichiro Kamino, Tokyo (JP); Atsuhiro Iyomasa, Tokyo (JP); Toru Hashigami, Aichi (JP)

(73) Assignee: Mitsubishi Aircraft Corporation, Nagoya-Shi (JP)

( * ) Notice: Subject to any disclaimer, the term of this patent is extended or adjusted under 35 U.S.C. 154(b) by 0 days.

(21) Appl. No.: 14/102,890

(22) Filed: Dec. 11, 2013

(65) Prior Publication Data

US 2014/0096991 A1 Apr. 10, 2014

Related U.S. Application Data

(63) Continuation of application No. 13/418,865, filed on Mar. 13, 2012, now Pat. No. 8,634,177.

(30) Foreign Application Priority Data

Mar. 14, 2011 (JP) .................................. 2011-55999

(51) Int. Cl.
| | |
|---|---|
| *H05H 3/02* | (2006.01) |
| *H01R 4/06* | (2006.01) |
| *B64C 3/34* | (2006.01) |
| *B64D 45/02* | (2006.01) |
| *F16B 37/14* | (2006.01) |
| *F16B 15/02* | (2006.01) |
| *F16B 5/02* | (2006.01) |
| *F16B 1/00* | (2006.01) |

(52) U.S. Cl.
CPC . *H01R 4/06* (2013.01); *F16B 15/02* (2013.01); *H05H 3/02* (2013.01); *B64C 3/34* (2013.01); *B64D 45/02* (2013.01); *F16B 5/02* (2013.01); *F16B 37/14* (2013.01); *F16B 2001/0064* (2013.01)
USPC .......................................... 361/218; 361/217

(58) Field of Classification Search
CPC ........... B64D 45/02; H05F 3/02; F16B 37/14; F16B 15/02; H01R 4/06
USPC ................................................. 361/218, 217
See application file for complete search history.

(56) References Cited

U.S. PATENT DOCUMENTS 3,906,308 A * 9/1975 Amason et al. ................ 361/218
3,989,984 A * 11/1976 Amason et al. ................ 361/212

(Continued)

FOREIGN PATENT DOCUMENTS

| JP | 02-007398 A | 1/1990 |
|---|---|---|
| JP | 2010-254287 A | 11/2010 |

*Primary Examiner* — Zeev V Kitov
(74) *Attorney, Agent, or Firm* — Pearne & Gordon LLP (57) ABSTRACT

Provided is a coupling structure for airframe components that is capable of ensuring sufficient lightning protection capability. A conductive pattern part 40 made of a conductive material is formed around each fastener member 24 between wing surface panels 21A and 21B. The conductive pattern part 40 is formed, for example, around each of holes 21c and 21d on the plane on which the wing surface panel 21A and the wing surface panel 21B abut against each other. Then, the conductive pattern part 40 is pushed against both the wing surface panel 21A and the wing surface panel 21B by the fastening power of the fastener members 24, whereby electrical conduction between the wing surface panel 21A and the wing surface panel 21B can be achieved.

15 Claims, 5 Drawing Sheets

(56) References Cited

U.S. PATENT DOCUMENTS

| | | |
|---|---|---|
| 4,502,092 A | 2/1985 | Bannink, Jr. et al. |
| 4,579,475 A * | 4/1986 | Hart-Smith et al. .......... 403/312 |
| 4,755,904 A | 7/1988 | Brick |
| 4,905,931 A | 3/1990 | Covey |
| 5,175,665 A | 12/1992 | Pegg |
| 5,461,534 A * | 10/1995 | Gondot et al. ................ 361/218 |
| 7,511,935 B2 * | 3/2009 | Nakash ......................... 361/234 |

* cited by examiner

COUPLING STRUCTURE FOR AIRFRAME COMPONENTS

This application is a Continuation of U.S. patent application Ser. No. 13/418,865 filed on Mar. 13, 2012, which is incorporated herein by reference in its entirety.

BACKGROUND OF THE INVENTION

1. Field of the Invention

The present invention relates to a coupling structure for airframe components such as wing surface panels constituting the airframe of an aircraft.

2. Description of the Related Art

In general, a wing constituting the airframe of an aircraft has a hollow structure, and a surface of the wing is formed of a plurality of wing surface panels. Then, two adjacent wing surface panels are coupled to each other by a fastener member (securing piece).

At this time, the two wing surface panels are coupled to each other by the fastener member in the following manner. That is, a pin-shaped fastener main body is inserted from the outer side of the wing into through-holes that are respectively formed on both the wing surface panels placed on top of each other. Then, the leading end part of the fastener main body is fixed by a fixing piece on the inner side of the wing.

Meanwhile, aircraft need to be fully prepared for a lightning strike. If lightning should strike an aircraft and a large current flows into a main wing of the aircraft, a part of, or in some cases the entirety of, the large current flows into a coupling portion between wing surface panels thereof. If the current value exceeds the threshold limit of a tolerable amount of current flowing through each coupling portion, a discharge phenomenon called an electric arc (or thermal spark) occurs. In this phenomenon, the current flowing through each coupling portion rapidly and locally increases the temperature of a boundary surface between the wing surface panels constituting the coupling portion and mainly made of a conductive material, and melts the boundary surface, so that a discharge occurs in the surrounding atmosphere. If this phenomenon occurs, melted substances called hot particles are scattered from the melted portion in many cases.

In general, the internal space of the wing also functions as a fuel tank. Hence, it is necessary to suppress the electric arc from occurring or seal the electric arc, to thereby prevent the generated arc discharge and the hot particles scattered thereby from coming into contact with flammable fuel vapor, at the time of the lightning strike.

Accordingly, for the purpose of lightning protection (explosion protection), it is necessary to reliably suppress the electric arc from occurring or seal the electric arc at a portion that can be filled with the flammable fuel vapor on a boundary surface between the fastener member and the wing surface panels coupled by the fastener member. Examples of the portion that can be filled with the flammable fuel vapor include the inside of the fuel tank, the inside of a surge tank generally disposed on a wing end side of the fuel tank (a tank in which a vent scoop and a burst disk are disposed), and the inside of fuel-system equipment, or the like.

Under the circumstances, the electric arc is sealed conventionally in the following manner. That is, the leading end part of the fastener member is covered with a sealant on the inner side of the wing. Alternatively, the leading end part of the fastener member is provided with a cap, and the gap between the cap and the fastener member is filled with an insulating material (for example, air). (See, for example, Japanese Patent Laid-Open Nos. 02-7398 and 2010-254287.)

In addition, in order to enable the fastener member to pass through members to be fastened, a technique called an interference fit or transition fit is generally adopted. In this technique, the inner diameters of through-holes formed in the members to be fastened and the outer diameter of the fastener member are set to fit dimensions based on the interference fit or a tolerance equivalent thereto, whereby a gap is prevented from being formed between the fastener member and the members through which the fastener member passes.

Figure 5A:
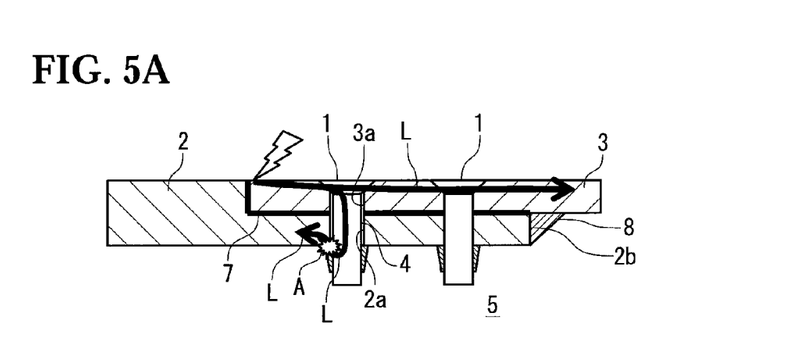
FIGS. 5A and 5B are cross-sectional views each illustrating a coupling portion between wing surface panels according to a conventional case.

In this regard, as illustrated in FIG. 5A, if a gap 4 exists between a fastener member 1 and through-holes 2a and 3a which are respectively formed in wing surface panels 2 and 3 and through which the fastener member 1 passes, a lightning current L flowing along a surface of the wing surface panel 3 at the time of a lightning strike flows from the fastener member 1 into the wing surface panel 2 on an internal space 5 side of the wing. Consequently, an electric arc A may occur at a boundary surface between the fastener member 1 and the wing surface panel 2 on the internal space 5 side of the wing. Note that an insulating layer 7 of a primer or any other materials is provided between the wing surface panel 2 and the wing surface panel 3 in a portion other than the through-holes 2a and 3a.

Figure 5B:
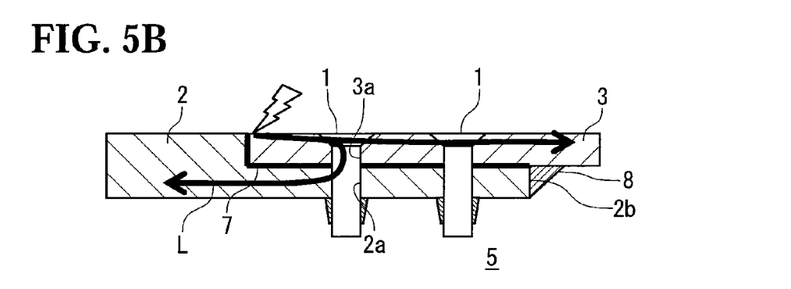

In contrast, the interference fit or transition fit is adopted, and as illustrated in FIG. 5B, the fastener member 1 is brought into close contact with the through-holes 2a and 3a which are respectively formed in the wing surface panels 2 and 3 and through which the fastener member 1 passes. This allows the lightning current L flowing along the surface of the wing surface panel 3 at the time of the lightning strike to flow from the fastener member 1 into the wing surface panel 2, inside (in a middle portion in the thickness direction) of the wing surface panel 2 located on the internal space side of the wing. In this way, the occurrence of the electric arc A as illustrated in FIG. 5A is suppressed.

Meanwhile, in order to suppress the occurrence of the electric arc A by adopting the interference fit or transition fit, the precision of the inner diameters of the through-holes 2a and 3a formed in the wing surface panels 2 and 3 are extremely important to prevent the gap 4 from being formed at the time of attaching the fastener member 1.

Accordingly, when the through-holes 2a and 3a are respectively formed in the wing surface panels 2 and 3, if a processing error occurs or the inner diameter is made excessively large by an error in dimensions, the gap 4 is formed. The electric arc A occurring in a portion in which a large current flows has correspondingly large energy. Hence, in the case where an electrical conduction function of the fastener member 1 is impaired, the sealant or the cap provided at the leading end part of the fastener member may not reliably suppress the occurrence of the electric arc A.

In addition, in an actual case, it is preferable to use in combination a plurality of occurrence suppressing means and sealing means for an electric arc, in order to increase the reliability. Therefore, electrical conduction on the plane on which the wing surface panels 2 and 3 abut against each other may be achieved in some cases by bringing the wing surface panels 2 and 3 into surface contact (so-called fay bonding). If the electrical conduction is partially impaired by some kind of trouble in processing, however, the resistance of this portion with the impaired electrical conduction increases, and the sealant or the cap may not reliably suppress the occurrence of the electric arc A. In addition, a sealant 8 is applied to a boundary portion between an end part 2b of the wing surface panel 2 and the wing surface panel 3 so as to cover the boundary portion, so that a so-called a fillet seal is formed. In the case where the fillet seal is insufficient, the electric arc A may not be suppressed from occurring from the boundary portion between the end part 2b of the wing surface panel 2 and the wing surface panel 3, depending on the level of the flowing current.

Accordingly, in the case of using in combination the plurality of occurrence suppressing means and sealing means for an electric arc, even if any of the occurrence suppressing means and sealing means for an electric arc cannot provide a sufficient function for some reason, it is preferable to suppress the occurrence of the electric arc so as to compensate the insufficient function.

The present invention has been devised on the basis of such a technical problem as described above, and therefore has an object to provide a coupling structure for airframe components that is capable of ensuring sufficient lightning protection capability.

SUMMARY OF THE INVENTION

In order to achieve the above-mentioned object, the present invention provides a coupling structure for airframe components, comprising: a fastener member that is inserted into a through-hole to fasten a plurality of members constituting an airframe of an aircraft, the through-hole being formed in a portion in which the plurality of members are placed on top of each other; a conductive area that is formed of a conductive material in a given part of a portion in which the plurality of members are opposed to each other; and an insulating area that is formed of an insulating material in a portion other than the given part of the portion in which the plurality of members are opposed to each other, wherein the insulating area is formed on an end part side of a member located on an inner side of the airframe among the plurality of members with respect to the conductive area in the portion in which the plurality of members are opposed to each other.

Electrical conduction between the plurality of members can be achieved by the conductive area formed as described above in the portion in which the plurality of members are opposed to each other. This allows a current caused at the time of a lightning strike to flow from one member to another member through the conductive area. Accordingly, the amount of current flowing through the other portion can be suppressed.

In addition, the insulating area is formed on the end part side of the member located on the inner side of the airframe among the plurality of members with respect to the conductive area in the portion in which the plurality of members are opposed to each other. Accordingly, the lightning current can be suppressed from flowing near the end part of the member located on the inner side of the airframe.

Here, the opposed members are not necessarily electrically connected to each other only through the conductive area. In addition to this, an outer peripheral surface of the fastener member may be brought into close contact with an inner peripheral surface of the through-hole, to thereby electrically connect the fastener member to the plurality of members through which the through-hole is formed. In this case, the amount of current flowing through the electrically conductive portion formed by the through-hole and the fastener member can be suppressed by the electrical conduction through the conductive area.

At this time, the conductive area may be formed in any pattern. For example, the conductive area may be formed in a belt-like pattern along the end part of the member located on the inner side of the airframe among the plurality of members. In this case, a large conductive area can be ensured, thereby reliably achieving the electrical conduction.

In addition, in the case where a plurality of the fastener members are arranged in a plurality of lines along the end part of the member located on the inner side of the airframe among the plurality of members, the conductive area may be formed in outer peripheral parts of fastener members arranged in a line far from the end part of the member located on the inner side of the airframe among the fastener members arranged in the plurality of lines. This allows a lighting current caused at the time of a lightning strike to flow from one member to another member in a portion of the conductive area far from the end part of the member located on the inner side of the airframe. Accordingly, the lightning current can be suppressed from flowing near the end part of the member located on the inner side of the airframe.

Here, the conductive area may be formed in a ring-shaped pattern around each of the outer peripheral parts of the fastener members. With this configuration, in the state where the plurality of members are fastened to each other by the fastener member, the fastening power of the fastener member brings the conductive area into close contact with the members sandwiching the conductive area, thereby reliably achieving the electrical conduction.

The inside of an airframe component, for example, a wing, which is obtained by placing a plurality of members on top of each other and coupling the members to each other, may function in some cases as a fuel tank or other such space in which fuel and fuel vapor exist. In this case, the lightning current can be effectively suppressed from flowing near the end part of the member located on the inner side of the airframe.

According to the present invention, the electrical conduction between the plurality of members can be achieved by the conductive area formed in the portion in which the plurality of members are opposed to each other. As a result, a lightning current flowing along a surface of one member located on the outer side of the airframe at the time of a lightning strike can flow into another member through the conductive pattern part without passing through the fastener member, so that the tolerable amount of current in the overlapped portion of the plurality of members can be enhanced.

In addition, the insulating area is formed on the end part side of the member located on the inner side of the airframe among the plurality of members with respect to the conductive area in the portion in which the plurality of members are opposed to each other. Accordingly, the lightning current can be suppressed from flowing near the end part of the member located on the inner side of the airframe.

With these features, an electric arc can be suppressed from occurring on the internal space side of the wing, so that sufficient lightning protection capability can be ensured.

Then, such a configuration as described above is used in combination with other occurrence suppressing means and sealing means for an electric arc at the time of a lightning strike. As a result, even if any of the means cannot provide a required function, the required function can be compensated, so that a high reliability can be ensured.

DETAILED DESCRIPTION OF THE PREFERRED EMBODIMENTS

Hereinafter, the present invention is described in detail by way of embodiments illustrated in the accompanying drawings.

First Embodiment

Figure 1A:
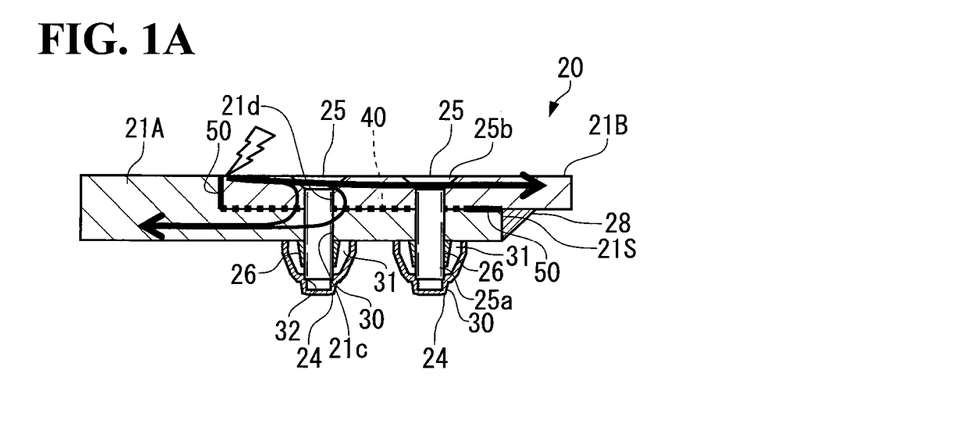
FIGS. 1A and 1B are a cross-sectional view and a plan view each illustrating a coupling portion between wing surface panels according to a first embodiment of the present invention.
Figure 1B:
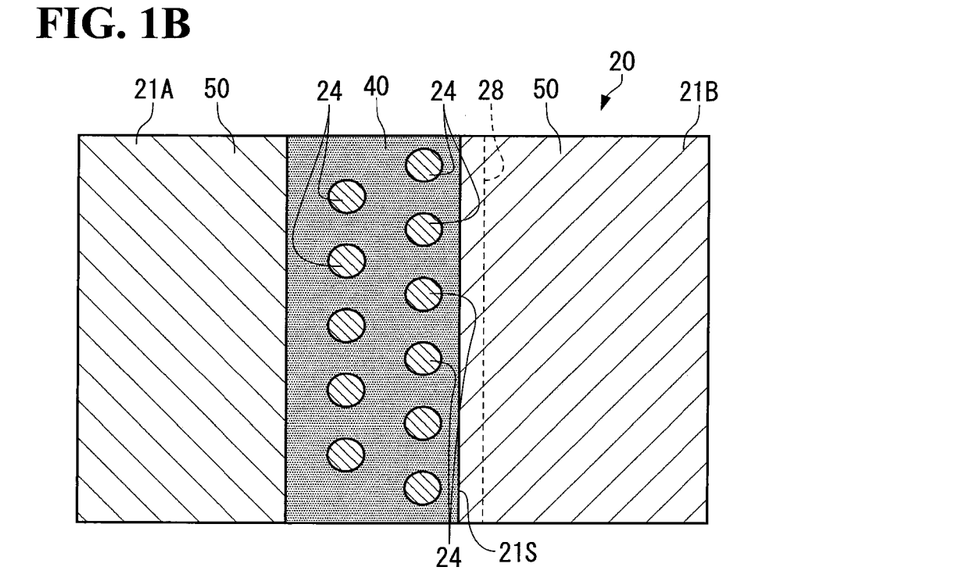

FIGS. 1A and 1B are a cross-sectional view and a plan view each illustrating part of a wing constituting the airframe of an aircraft to which a coupling structure for airframe components is applied according to a first embodiment of the present invention.

As illustrated in FIG. 1A, the outer frame of a wing 20 is formed by coupling a plurality of wing surface panels (members) 21A, 21B, ..., and the wing surface panels 21A, 21B ... are made of, for example, metal materials such as an aluminum alloy, carbon fiber reinforced plastics (CFRP) that are composite materials of carbon fiber and resin, and glass fiber reinforced plastics (GFRP) that are composite materials of glass fiber and resin. Then, end parts of the adjacent wing surface panels 21A and 21B are placed on top of each other, and the adjacent wing surface panels 21A and 21B are coupled to each other by a plurality of fastener members 24 in the overlapped portion thereof.

Each fastener member 24 includes a pin-shaped fastener main body 25 and a collar (fastening member) 26 that is fitted to the fastener main body 25 on the inner side of the wing 20.

The fastener main body 25 and the collar 26 are generally formed of metal materials (for example, titanium, stainless steel, and aluminum or the like) in terms of strength. Surface treatment of the fastener main body 25 is selected depending on a used portion and a construction method, and a process for solid metal materials, an insulating coating process using alumina, a conductive process using ion vapor deposition, and other such processes can be used therefor.

The pin-shaped fastener main body 25 includes: a leading end part 25a having a thread groove formed therein; and a base end part configured as a head part 25b having a diameter larger than that of the leading end part 25a. The fastener main body 25 is inserted from the outer side of the wing 20 into holes 21c and 21d that are formed so as to respectively pass through the end parts of the wing surface panel 21A and the wing surface panel 21B, and the leading end part 25a of the fastener main body 25 is protruded toward the inner side of the wing 20 with the head part 25b as the base end part abutting against a peripheral surface of the hole 21d.

Here, a technique called an interference fit or transition fit is adopted. In this technique, the outer diameter of the fastener main body 25 and the inner diameters of the holes 21c and 21d are set to fit dimensions based on the interference fit or a tolerance equivalent thereto. As a result, the fastener main body 25 is brought into close contact with the holes 21c and 21d, and a gap is thus prevented from occurring therebetween. Electrical conduction between the fastener main body 25 and the holes 21c and 21d can be achieved by such a technique, so that so-called fastener bonding is realized.

The collar 26 has a tube-like shape and an inner peripheral surface on which a thread groove is formed. The collar 26 is screwed into the thread groove formed in the leading end part 25a of the fastener main body 25, the leading end part 25a protruding toward the inner side of the wing 20. As a result, the wing surface panels 21A and 21B are sandwiched between the head part 25b of the fastener main body 25 and the collar 26, so that the wing surface panel 21A is coupled to the wing surface panel 21B.

Then, on the internal space side of the wing 20, a cap 30 is fitted to the fastener member 24 so as to cover the leading end part 25a of the fastener main body 25 and the collar 26, and the inside of the cap 30 is filled with an insulating sealant 31.

It is preferable to form the cap 30 of an insulating resin such as polyphenylene sulfide (PPS), polyimide, polyetheretherketone (PEEK), nylon resin, or the like.

A thread hole 32 is formed on an inner peripheral surface of the cap 30. The leading end part 25a of the fastener main body 25 is screwed into the thread hole 32 with the cap 30 abutting against the wing surface panel 21A, whereby the cap 30 can be easily and reliably positioned and fixed to the fastener member 24.

Note that, instead of the cap 30 as described above, a sealant may be applied so as to cover the leading end part 25a of the fastener main body 25 and the collar 26.

As illustrated in FIG. 1B, the wing surface panels 21A and 21B are fastened to each other by the plurality of fastener members 24, and the plurality of fastener members 24 are arranged at given intervals in a continuous direction of an end part 21S of the wing surface panel 21A located on the inner side of the airframe in the overlapped portion of the wing surface panels 21A and 21B.

In this case, the fastener members 24 are arranged in, for example, two lines in the continuous direction of the end part 21S of the wing surface panel 21A.

A conductive pattern part 40 is formed in a continuous belt-like pattern along the outer shape of the wing surface panel 21B in a region in which the plurality of fastener members 24 are arranged in the plurality of lines, in the overlapped portion of the wing surface panels 21A and 21B.

It is preferable to form the conductive pattern part 40 of a conductive material that is not easily oxidized, and, for example, a chromate chemical conversion coating is preferable. The chromate chemical conversion coating can be formed by performing an Alodine (registered trademark) process on at least one of the wing surface panel 21A and the wing surface panel 21B.

Alternatively, the conductive pattern part 40 can also be formed by, for example, powderizing a conductive material such as aluminum, copper, and gold, mixing the conductive material powder with paint, and applying the resultant mixture to at least one of the wing surface panel 21A and the wing surface panel 21B.

In this case, the conductive material powder is pushed against both the wing surface panel 21A and the wing surface panel 21B by the fastening power of the fastener members 24, whereby electrical conduction between the wing surface panel 21A and the wing surface panel 21B can be achieved.

Then, an insulating primer layer (insulating area) 50 that continues in a belt-like pattern along the end part 21S of the wing surface panel 21A is applied to and formed in at least one of the wing surface panel 21A and the wing surface panel 21B, near a boundary portion between the end part 21S of the wing surface panel 21A and the wing surface panel 21B in the overlapped portion of the wing surface panels 21A and 21B.

In this way, a so-called fay bonding part is formed by the conductive pattern part 40 and the primer layer 50 in the overlapped portion of the wing surface panels 21A and 21B.

When the wing surface panels 21A and 21B are fastened to each other by the fastener members 24 as described above, the wing surface panels 21A and 21B are electrically connected to each other by the conductive pattern part 40, whereas the wing surface panels 21A and 21B are insulated from each other by the primer layer 50 as the insulating area in the portion along the end part 21S of the wing surface panel 21A.

In addition, a sealant 28 is applied to the boundary portion between the end part 21S of the wing surface panel 21A and the wing surface panel 21B, so that a so-called a fillet seal is formed.

As a result, a lightning current L flowing along a surface of the wing surface panel 21B at the time of a lightning strike can flow into the wing surface panel 21A through the conductive pattern part 40. This can suppress an electric arc from occurring on the internal space side of the wing 20.

Then, the lightning current L is insulated by the primer layer 50 as the insulating area in the region near the end part 21S of the wing surface panel 21A, and hence the electric arc can be sealed so as not to occur on the internal space side of the wing 20. This can more reliably suppress the electric arc from occurring in the portion in which the fillet seal is formed by the sealant 28, that is, the boundary portion between the end part 21S of the wing surface panel 21A and the wing surface panel 21B. Accordingly, even if the fillet seal formed by the sealant 28 should come off the boundary portion between the end part 21S of the wing surface panel 21A and the wing surface panel 21B, the electric arc can be reliably sealed so as not to occur on the internal space side of the wing 20.

Such a configuration as described above is used in combination with: the fillet seal formed by the sealant 28 in the boundary portion between the end part 21S of the wing surface panel 21A and the wing surface panel 21B; and the fastener bonding between the fastener main body 25 and the holes 21c and 21d, that is, other occurrence suppressing means and sealing means for an electric arc at the time of a lightning strike. As a result, even if any of the means cannot provide a required function, the required function can be compensated, so that a high reliability can be ensured.

In this way, in the case where the internal spaces of the wing surface panels 21A and 21B function as a fuel tank or other such space in which fuel and fuel vapor exist, the electric arc can be reliably prevented from being scattered into these spaces, so that the reliability can be enhanced.

Next, a plurality of modified embodiments according to the present invention are described.

The embodiments described below are different from the first embodiment only in the region in which the conductive pattern part 40 is formed, and are common to the first embodiment in the other configuration. Accordingly, elements common to those of the first embodiment are denoted by the same reference signs, description thereof is omitted, and the configuration different from that of the first embodiment is mainly described in the following.

Second Embodiment

Figure 2A:
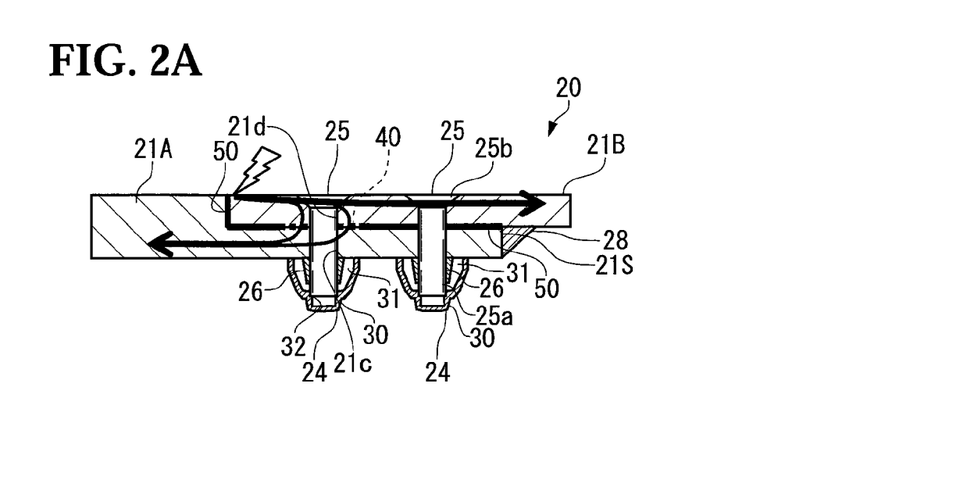
FIGS. 2A and 2B are a cross-sectional view and a plan view each illustrating a coupling portion between wing surface panels according to a second embodiment of the present invention.
Figure 2B:
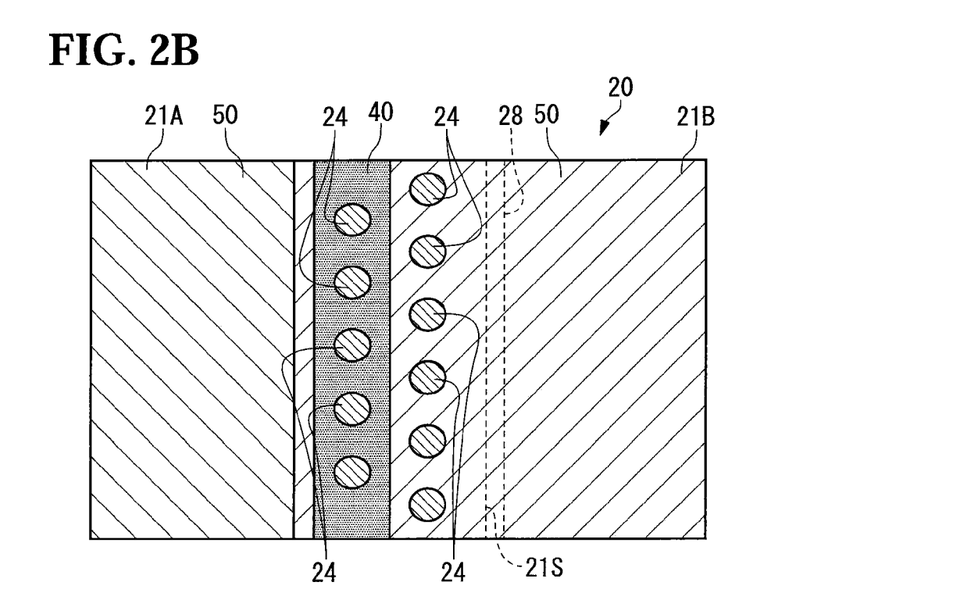

In a second embodiment of the present invention, as illustrated in FIGS. 2A and 2B, the conductive pattern part 40 is formed in a continuous belt-like pattern along the outer shape of the wing surface panel 21B, only in a region corresponding to the fastener members 24 that are arranged in a line far from the boundary portion between the end part 21S of the wing surface panel 21A and the wing surface panel 21B, in the overlapped portion of the wing surface panels 21A and 21B.

With this configuration, the lightning current L flowing along the surface of the wing surface panel 21B at the time of a lightning strike can flow into the wing surface panel 21A through the conductive pattern part 40 formed in the region corresponding to the fastener members 24 that are arranged in the line far from the boundary portion between the end part 21S of the wing surface panel 21A and the wing surface panel 21B.

The primer layer 50 as the insulating area is formed in a belt-like pattern with a wider width so as to reach a region far from the end part 21S of the wing surface panel 21A, compared with the first embodiment. Hence, the present embodiment produces a larger effect of insulating the lightning current L in the region near the end part 21S of the wing surface panel 21A.

This can more reliably suppress the electric arc from occurring in the portion in which the fillet seal is formed by the sealant 28, that is, the boundary portion between the end part 21S of the wing surface panel 21A and the wing surface panel 21B. Accordingly, even if the fillet seal formed by the sealant 28 should come off the boundary portion between the end part 21S of the wing surface panel 21A and the wing surface panel 21B, the electric arc can be more reliably sealed so as not to occur on the internal space side of the wing 20.

In this way, in the case where the internal spaces of the wing surface panels 21A and 21B function as a fuel tank or other such space in which fuel and fuel vapor exist, the electric arc can be reliably prevented from being scattered into these spaces, so that the reliability can be enhanced.

Third Embodiment

Figure 3A:
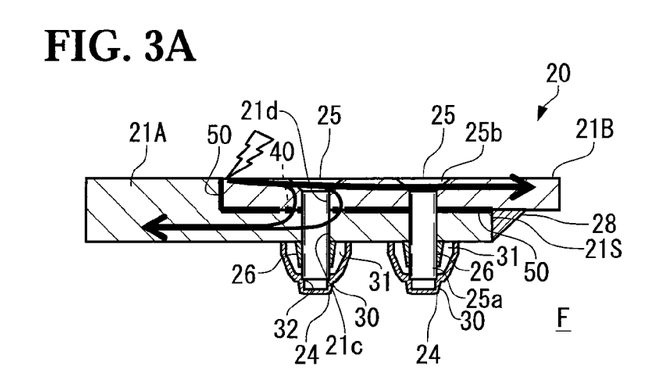
FIGS. 3A and 3B are a cross-sectional view and a plan view each illustrating a coupling portion between wing surface panels according to a third embodiment of the present invention.
Figure 3B:
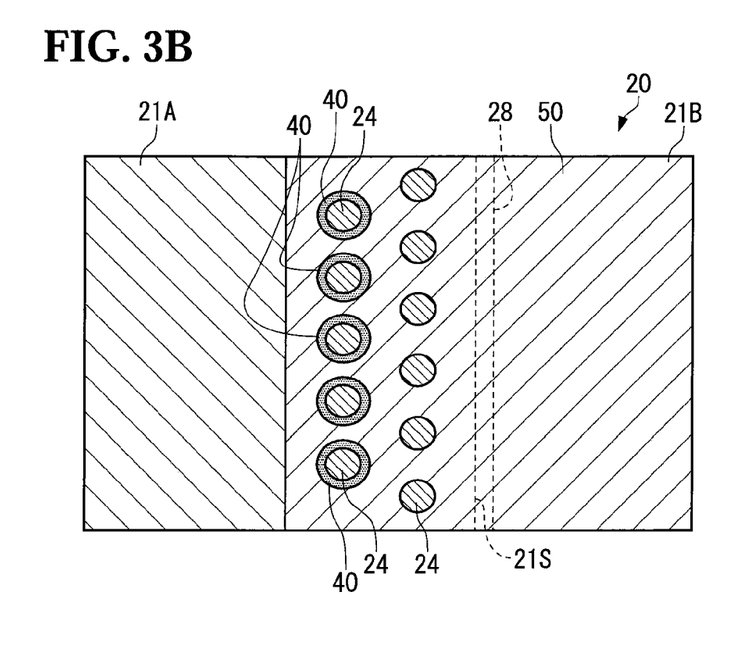

In a third embodiment of the present invention, as illustrated in FIGS. 3A and 3B, the conductive pattern part 40 is formed only around each of the fastener members 24 that are arranged in a line far from the boundary portion between the end part 21S of the wing surface panel 21A and the wing surface panel 21B, of all the fastener members 24 that are arranged in the plurality of lines along the boundary portion between the end part 21S of the wing surface panel 21A and the wing surface panel 21B, in the overlapped portion of the wing surface panels 21A and 21B. The conductive pattern part 40 is not formed around each of the fastener members 24 arranged in the other lines, and the primer layer 50 is formed in outer peripheral parts thereof. The conductive pattern part 40 is formed, for example, in a ring-shaped pattern around each of the holes 21c and 21d on the plane on which the wing surface panel 21A and the wing surface panel 21B abut against each other.

With this configuration, the lightning current L flowing along the surface of the wing surface panel 21B at the time of a lightning strike can flow into the wing surface panel 21A through the conductive pattern parts 40 formed far from the boundary portion between the end part 21S of the wing surface panel 21A and the wing surface panel 21B.

In addition, the primer layer 50 as the insulating area is formed in a larger area so as to reach a region far from the end part 21S of the wing surface panel 21A, compared with the first embodiment. Hence, the present embodiment produces a larger effect of insulating the lightning current L in the region near the end part 21S of the wing surface panel 21A.

This can more reliably suppress the electric arc from occurring in the portion in which the fillet seal is formed by the sealant 28, that is, the boundary portion between the end part 21S of the wing surface panel 21A and the wing surface panel 21B. Accordingly, even if the fillet seal formed by the sealant 28 should come off the boundary portion between the end part 21S of the wing surface panel 21A and the wing surface panel 21B, the electric arc can be more reliably sealed so as not to occur on the internal space side of the wing 20.

In this way, in the case where the internal spaces of the wing surface panels 21A and 21B function as a fuel tank or other such space in which fuel and fuel vapor exist, the electric arc can be reliably prevented from being scattered into these spaces, so that the reliability can be enhanced.

Figure 4A:
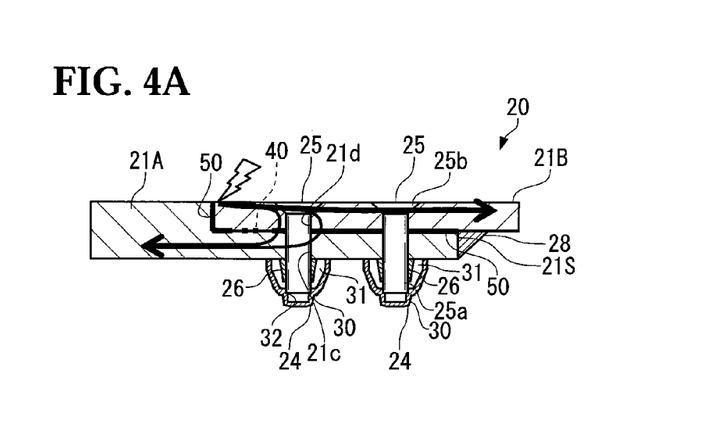
FIGS. 4A and 4B are a cross-sectional view and a plan view each illustrating a coupling portion between wing surface panels according to still another embodiment of the present invention.
Figure 4B:
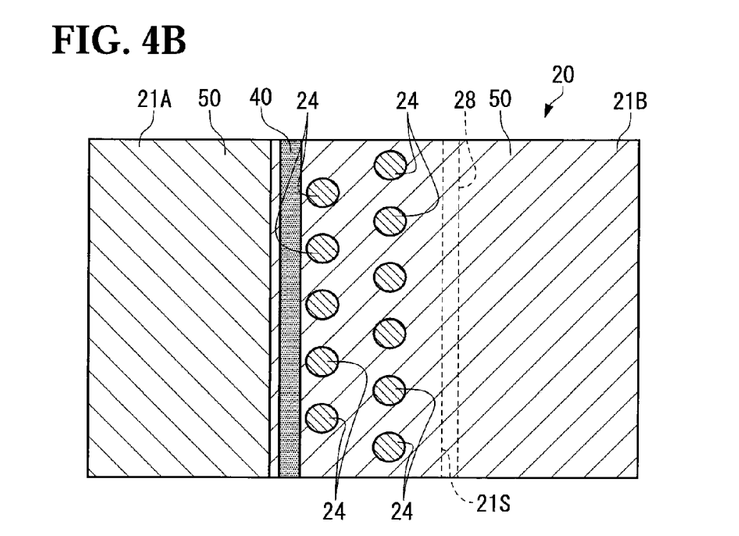

In still another embodiment of the present invention, as illustrated in FIGS. 4A and 4B, the conductive pattern part 40 may be formed in a belt-like pattern along the outer shape of the wing surface panel 21B in a region shifted toward an outer periphery of the wing surface panel 21B from the positions at which the fastener members 24 are provided, in the overlapped portion of the wing surface panels 21A and 21B, instead of the outer peripheral parts of the fastener members 24.

In this configuration, in the case where the internal spaces of the wing surface panels 21A and 21B function as a fuel tank or other such space in which fuel and fuel vapor exist, it is preferable to form the conductive pattern part 40 continuously to an outer peripheral part of a fuel tank F as far as possible from the boundary portion between the end part 21S of the wing surface panel 21A and the wing surface panel 21B.

Note that, in the above-mentioned embodiments, description is given of the example in which the present invention is applied to the coupling portion between the wing surface panels 21A and 21B, but the present invention is not limitatively applied thereto. The present invention can be applied to a coupling portion between any airframe components such as wing surface panels as long as the airframe components constitute the airframe of an aircraft and a lightning current may flow therethrough at the time of a lightning strike.

In addition to the above, the configurations described in the embodiments can be selectively adopted or can be appropriately changed into another configuration, within the range not departing from the scope of the present invention.

What is claimed is:

1. A coupling structure for airframe components, comprising:
   a fastener member that fastens a first member and a second member adjacent to each other, the first member and the second member constituting an airframe of an aircraft and being placed on top of each other in an overlapped portion, the fastener member being inserted into a through-hole formed in the overlapped portion;
   a conductive area that is formed of a conductive material at an interface between the first member and the second member in a first part of the overlapped portion, the conductive area providing an electrical path from the first member through the conductive area to the second member; and
   an insulating area that is formed of an insulating material at the interface in a second part of the overlapped portion, wherein the insulating area is located in the overlapped portion between an end part of the first member and the conductive area.

2. The coupling structure for airframe components according to claim 1, wherein
   an outer surface of the fastener member is in contact with an inner surface of the through-hole, and the fastener member electrically connects to the first member and the second member.

3. The coupling structure for airframe components according to claim 1, wherein
   the conductive area extends along the end part of the first member.

4. The coupling structure for airframe components according to claim 1, wherein
   a plurality of the fastener members are arranged in a plurality of lines along the end part of the first member, and
   the conductive area is located in outer peripheral parts of the fastener members that are arranged in one of the plurality of lines that is farthest from the end part of the first member.

5. The coupling structure for airframe components according to claim 4, wherein
   the conductive area is formed in a ring-shaped pattern around each of the outer peripheral parts of the fastener members arranged in the farthest line.

6. The coupling structure for airframe components according to claim 1, wherein the end part of the first member and an end part of the second member are both located in the overlapped portion.

7. The coupling structure for airframe components according to claim 1, wherein the conductive area is formed as a coating.

8. The coupling structure for airframe components according to claim 1, wherein the conductive area is formed as a layer.

9. The coupling structure for airframe components according to claim 1, wherein the conductive material has an oxidation resistance.

10. The coupling structure for airframe components according to claim 9, wherein the conductive material comprises a chromate chemical conversion coating.

11. The coupling structure for airframe components according to claim 1, wherein the conductive area comprises a powdered material comprising aluminum.

12. The coupling structure for airframe components according to claim 1, wherein the insulating area comprises an insulating primer layer.

13. The coupling structure for airframe components according to claim 1, further comprising:
    a fillet seal comprising a sealant applied to a boundary portion between a tip of the end part of the first member and the second member.

14. The coupling structure for airframe components according to claim 1, wherein the first member is located at an inner side of the airframe in the overlapped portion, and wherein the second member is located at an outer side of the airframe in the overlapped portion.

15. The coupling structure for airframe components according to claim 1, wherein the through-hole is formed in the first member and the second member.

* * * * *